United States Patent
Saad et al.

(10) Patent No.: US 9,237,089 B2
(45) Date of Patent: Jan. 12, 2016

(54) ENHANCED PATH SELECTION SCHEME FOR EQUAL COST PATHS IN COMMUNICATION NETWORKS

(71) Applicant: Cisco Technology, Inc., San Jose, CA (US)

(72) Inventors: Tarek Saad, Nepean (CA); Sherif Saeed Awad, Ottawa (CA); Zafar Ali, Hicksville, NY (US); Michel Taillon, Stittsville (CA)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 13/754,247

(22) Filed: Jan. 30, 2013

(65) Prior Publication Data

US 2014/0211632 A1 Jul. 31, 2014

(51) Int. Cl.
*H04L 12/721* (2013.01)
*H04L 12/729* (2013.01)
*H04L 12/707* (2013.01)
*H04L 12/723* (2013.01)

(52) U.S. Cl.
CPC .............. *H04L 45/124* (2013.01); *H04L 45/62* (2013.01); *H04L 45/125* (2013.01); *H04L 45/24* (2013.01); *H04L 45/50* (2013.01)

(58) Field of Classification Search
None
See application file for complete search history.

(56) References Cited

U.S. PATENT DOCUMENTS

| 7,814,227 | B2 | 10/2010 | Vasseur et al. |
| 8,320,255 | B2 | 11/2012 | Vasseur et al. |
| 2006/0182035 | A1* | 8/2006 | Vasseur ......................... 370/238 |
| 2009/0067322 | A1 | 3/2009 | Shand et al. |
| 2013/0286846 | A1* | 10/2013 | Atlas et al. .................... 370/236 |

OTHER PUBLICATIONS

Lampreia, et al., "Notification of Transmission of the International Search Report and the Written Opinion of the International Searching Authority, or the Declaration", Patent Cooperation Treaty, PCT/US2014/013572, mailed Apr. 23, 2014, 12 pages, European Patent Office, Rijswijk, Netherlands.

Zhu, et al., "Traffic Engineering in Multigranularity Heterogeneous Optical WDM Mesh Networks Through Dynamic Traffic Grooming", IEEE Network vol. 17, No. 2, pp. 8-15, Mar. 2003, New York, NY.

Apostolopoulos, et al., "QoS Routing Mechanisms and OSPF Extensions", Network Working Group, Request for Comments 2676, Aug. 1999, 50 pages, The Internet Society.

* cited by examiner

*Primary Examiner* — Chirag Shah
*Assistant Examiner* — Srinivasa Reddivalam
(74) *Attorney, Agent, or Firm* — Parker Ibrahim & Berg LLC; James M. Behmke; Stephen D. LeBarron

(57) ABSTRACT

In one embodiment, a node in a communication network receives a label switched path (LSP) request and in response, the node determines at least two equal cost paths, each path having one or more path-nodes. The node may then further determine a total bandwidth-based transition value for each path of the at least two equal cost paths and selects the path having a lower total transition value. Once selected, the node may establish the requested LSP over the selected path.

18 Claims, 10 Drawing Sheets

ENHANCED PATH SELECTION SCHEME FOR EQUAL COST PATHS IN COMMUNICATION NETWORKS

TECHNICAL FIELD

The present disclosure relates generally to communication networks, and, more particularly, to an enhanced path selection scheme for equal cost paths.

BACKGROUND

Communication networks control how information, e.g., data, is transmitted from a source (e.g., a root or source node) to a specified destination (e.g., a destination node) via various communication protocols. For example, one protocol—multiprotocol label switching (MPLS)—defines a label-switched path (LSP) from the source node through various network nodes to the destination node. The LSP may be defined based on a forwarding equivalent class (FEC) and as the data is forwarded to various nodes in the MPLS network, the label is switched.

For some network routing applications, particular routing protocols can be optimized according to various techniques. For example, for a communication network such as an optical transport network (OTN), data can be routed using LSPs optimized according to routing techniques such as shortest path first (SPF) or constrained shortest path first (CSPF). Notably, OTNs generally include a set of Optical Network Elements (ONEs) connected by optical fiber links that are able to provide functionality of transport, multiplexing, switching, management, supervision and survivability of optical channels carrying information or data packets (e.g., via optical signals). However, even these optimized routing techniques can sometimes yield multiple equal cost paths. Typically, an arbitrary tiebreaker path selection technique is used to select one of these multiple equal cost paths. However, such an arbitrary tiebreaker path selection technique can yield inefficient and poor usage of network resources, and can potentially block subsequent traffic demand requests for the selected path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a node in a communication network receives a label switched path (LSP) request and in response, the node determines at least two equal cost paths having one or more path-nodes. The node may then further determine a total bandwidth-based transition value for each of the paths and selects the path having a lower total transition value. Once selected, the node may establish the requested LSP over the selected path.

Description

A communication network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Figure 1:
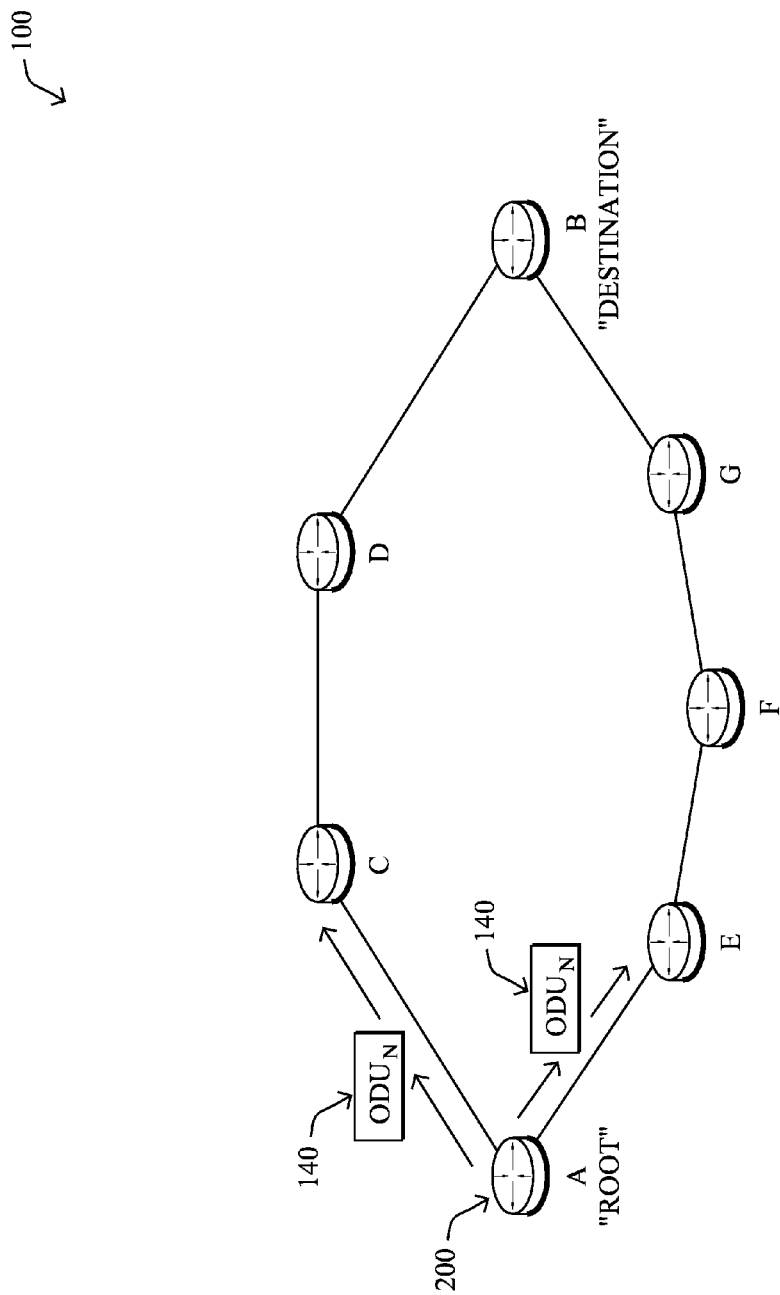
FIG. 1 is a schematic block diagram of an example communication network.

FIG. 1 is a schematic block diagram of an example communication network 100 illustratively comprising nodes/devices 200 (e.g., labeled as shown, "A," "C,", "D" . . . "B," and described in FIG. 2 below) interconnected by various methods of communication. For instance, the links 105 may be wired links (e.g., optical links) or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the communication network, and that the view shown herein is for simplicity. Also, those skilled in the art will further understand that while the network is shown in a certain orientation, the network 100 is merely an example illustration that is not meant to limit the disclosure.

Data packets 140 (e.g., traffic and/or messages such as optical data units (ODUs) sent between the devices/nodes) may be exchanged among the nodes/devices of the communication network 100 using predefined network communication protocols such as certain known wired protocols (e.g., optical standards), wireless protocols, or other protocols where appropriate. As discussed above, a protocol consists of a set of rules defining transmission of data amongst nodes and interaction therewith.

Figure 2:
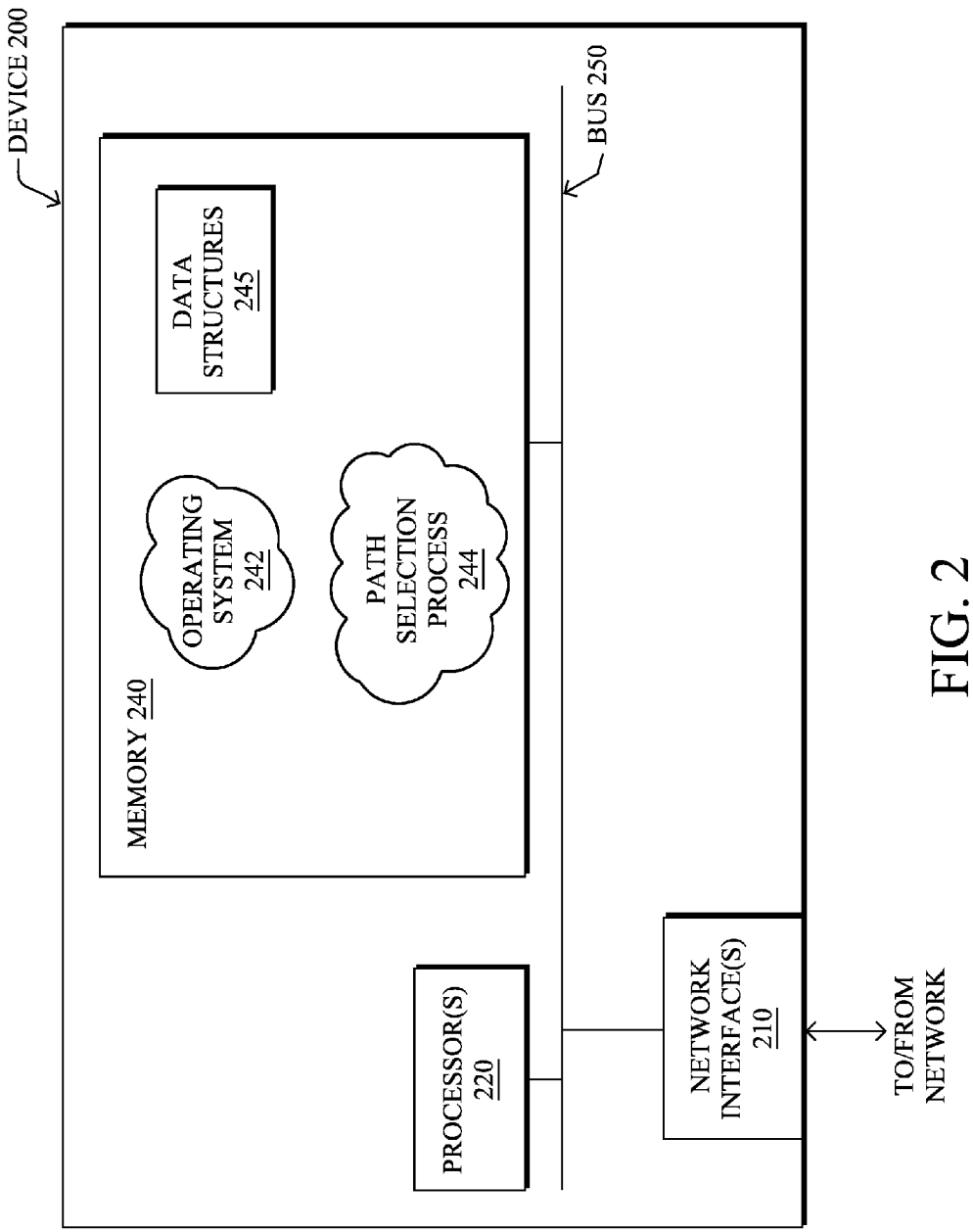
FIG. 2 is a schematic block diagram of an example node/device.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, optical, wireless, etc.), at least one processor 220, and a memory 240 interconnected by a system bus 250.

The network interface(s) 210 contain the mechanical, electrical, and signaling circuitry for communicating data over the data links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative path selection process/services 244, as described herein. Note that while path selection process/services 244 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Path selection process (services) 244 contains computer executable instructions executed by the processor 220 to perform functions provided by one or more communication and/or routing protocols, such as SONET/SDH, proactive routing protocols, tunneling protocols, etc., as will be understood by those skilled in the art, and as modified according to the techniques described herein. These functions may, for example, be capable of performing optical multiplexing, general packet routing/forwarding, hierarchical tunnel forwarding, etc., according to the associated protocols and the techniques described herein, and using various routing/forwarding tables, lists, mappings, etc. (e.g., data structures 245).

As discussed above, for instance, communication network 100 can include an optical transport network (OTN). Optical transport networks (OTNs), such as ITU Telecommunication Standardization Sector optical networks, are a particular type of network that use optical network elements connected by optical fiber links and are able to provide functionality for transport, multiplexing, switching, management, supervision and survivability of optical channels carrying data signals. OTNs support optical networking using wavelength-division multiplexing and provide a digital wrapper to encapsulate an existing frame of data, regardless of the native protocol, to create optical data units (ODUs).

Figure 3A:
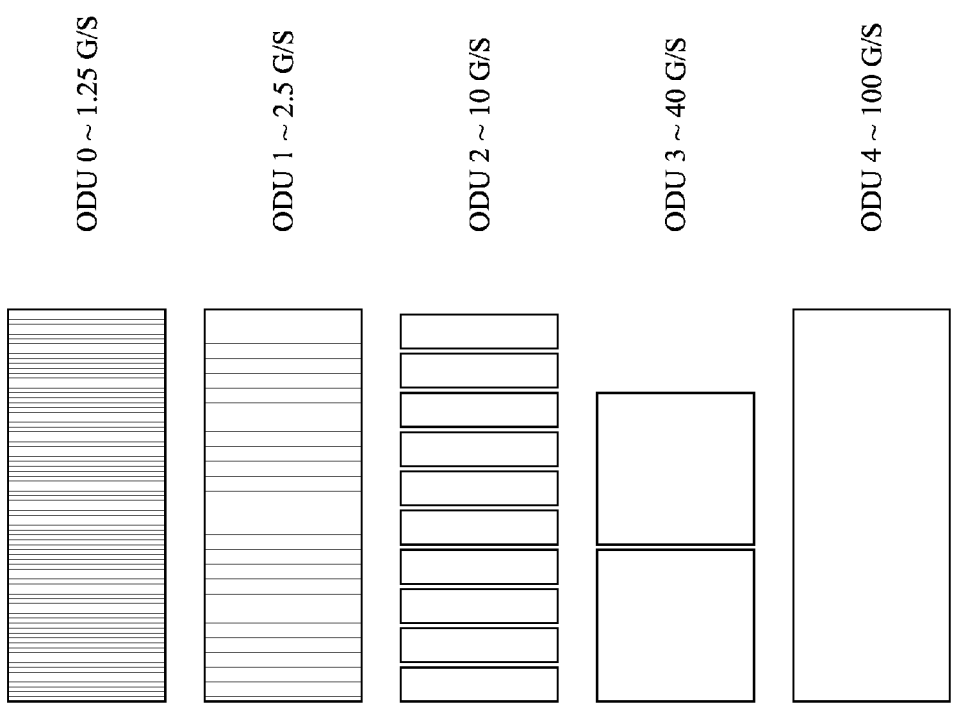
FIG. 3A illustrates an example view of optical data unit (ODU) containers used to encapsulate data.

FIG. 3A illustrates an example view of optical data unit (ODU) containers used to encapsulate data. ODUs can be used in, for example, a SDH/SONET OTN. ODU digital file wrappers and are flexible in terms of frame size and allow multiple exiting frames of data to be wrapped together into a single entity that can be more efficiently managed through a smaller amount of overhead in a multi-wavelength system. ODUs, in turn, are typically referred to as lower order or higher order. A higher order ODU generally refers to a server layer to which a lower order ODU (client layer) is mapped. With respect to the flexible frame size, ODUs include a parameter referred to as tributary slot granularity which refers to a data rate of the timeslots within the ODU. Examples of optical ODUs that are fixed in the amount of data and data rate include those specified by for example, ODU0, ODU1, ODU2, ODU3, ODU4, etc, with an increase in the ODU number corresponding to a larger digital file wrapper (e.g., an increase in data capacity/size). An example of an optical channel data unit in which the data rate can be arbitrarily set is referred to in the art as ODUflex. As shown in FIG. 3A, each of ODU0-ODU4 are illustrated with respect to the amount of data each ODU can encapsulate.

Figure 3B:
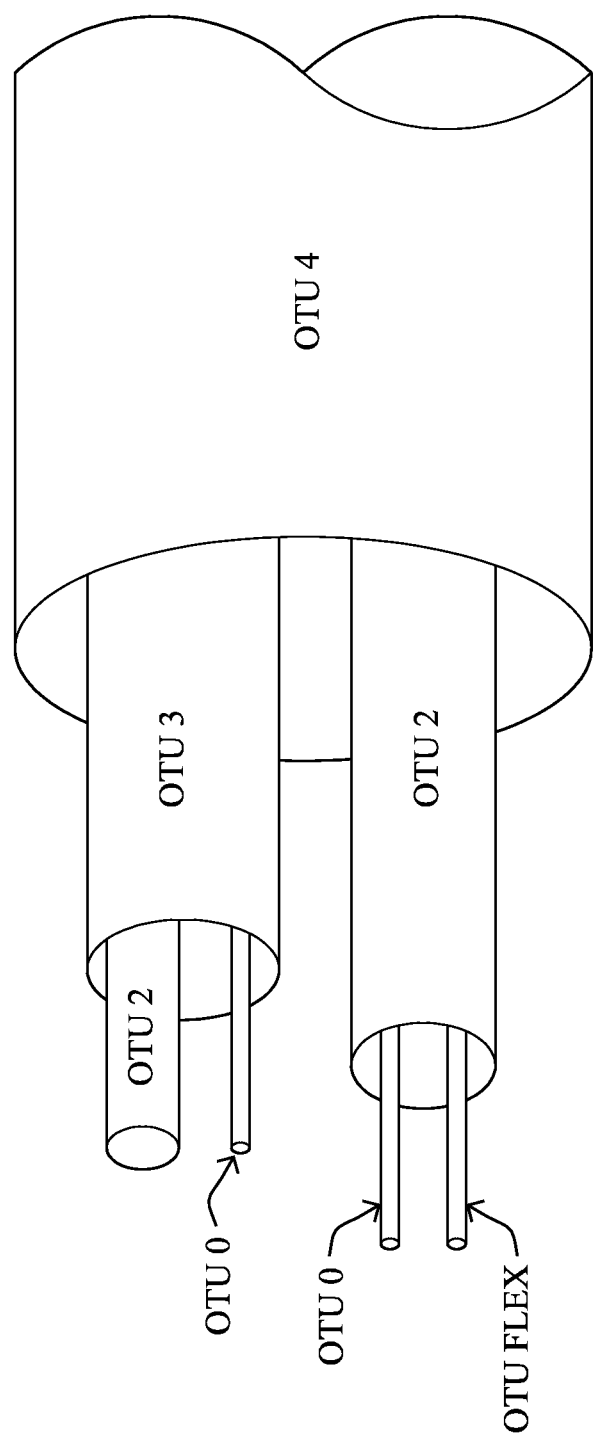
FIG. 3B illustrates a example multiplexing hierarchy for OTU links that can transport the various ODUs shown in FIG. 3A.

FIG. 3B illustrates a example multiplexing hierarchy for OTU links that can transport the various ODUs shown in FIG. 3A. Particularly, FIG. 3B illustrates tunneled hierarchies or stages of OTU. This multiplex hierarchy is supported by digital multiplexers (e.g., nodes 200) that can produce signals of successively higher data rates at each level of the hierarchy. For example, an ODU3 (40 G/s) mapped to an OTU3 link and an ODU 2 (10 G/s) mapped to an OTU2 link can be further tunneled or multiplexed to a higher order ODU4 (100 G/s) on an OTU4 link.

As noted above, in a typical traffic-engineering network, there may be multiple possible equal cost paths to route a traffic demand request. Traditional routing protocols select one of the equal cost paths based on an arbitrary tiebreaker. Such arbitrary tiebreaker can favor a particular path according to, for example:

the least accumulative weight in order to minimize total cost; or, when paths have the same accumulative weight the path with the larger path minimum available bandwidth to achieve load balancing; or, when paths have the same accumulative weight and same minimum available bandwidth the path with the least accumulative hop count to minimize bandwidth usage; or, when paths have the same accumulative weight, path minimum available bandwidth; and path accumulative hop count, which maintains the last used chronologically learned path.

However, such tiebreaker selection techniques can yield inefficient and poor usage of network resources, and can potentially block subsequent traffic demand requests for the selected path. For example, such tiebreaker selection techniques fail to appreciate various other types of networks having additional capabilities. In particular, in OTN networks, in addition to the above mentioned criteria, it may also be possible to map the OTN traffic demand requests onto the available link(s) or path(s) in multiple different ways depending on the traversed link(s) switching capabilities and/or different possible multiplexing stage hierarchies.

Figure 3C:
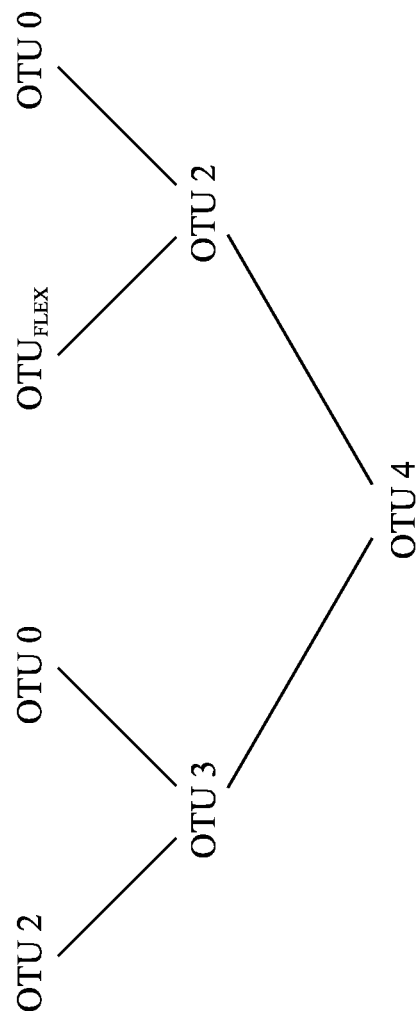
FIG. 3C illustrates another example multiplexing hierarchy for OUT links that can transport the various ODUs shown in FIG. 3A.

For example, as an alternate view of FIG. 3B, FIG. 3C illustrates a multiplexing hierarchy for OTU links that may be used for transporting example ODUs. In particular, according to the illustrated multiplexing hierarchy, it is possible to map an ODU2 request onto an OTU2 link directly, which entails a zero or no-stage multiplexing, or through ODU2 into ODU3 multiplexing of an OTU3 link via single or one stage multiplexing. It may also be possible to achieve this through an ODU2 into an ODU3 multiplexing that is tunneled into an ODU4 of an OTU4 link via 2-stage multiplexing. In this case, traditional tie-breaker techniques prove inadequate and can result in undesirable fragmentation across multiple stages. In other words, fragmentation is undesirable since it splits or breaks apart a larger sized ODU container (e.g., an ODU4) in order to accommodate a smaller ODU container (e.g., ODU2). In turn, this fragmentation can result in poor usage of OTN link resources (e.g., leaving a "remainder" unusable portion of the larger ODU container) and increases potential of blocking Higher Order ODU(k) traffic demand requests by tying up existing resources with Low Order traffic demand requests.

The techniques described herein provide for path selection for traffic demands between multiple equal cost paths and minimizes the multiplexing hierarchy along High Order (HO) ODU traversed links and favors a flat hierarchy that maps traffic demands. In particular, for paths of same multiplexing hierarchy, the techniques favor path selection that minimizes the HO to LO ODU differential achieving packing on links with lower ODU containers. The selection techniques may also load balance requests onto multiple possible link(s) or path(s) based on the minimum path available bandwidth when all other attributes match. Such selection can provide load balancing among multiple paths, as is understood by those skilled in the art.

Specifically, the selection techniques herein optimize utilization and mapping of traffic demands onto the available OTN network resources based on a bandwidth-based transition value (e.g., an accumulative multiplexing stage count and an accumulative multiplexing differential). As discussed herein, an accumulative multiplexing stage count represents the summation of stage hops at each traversed link of the path necessary for the multiplexing hierarchy needed to carry the LSP signal type from end-to-end. For example, a path that traverses two links that both use single-stage multiplexing have the accumulative multiplexing stage count of two (i.e., two counts of a single stage). Likewise, a path that uses two links of 0-stage multiplexing has an accumulative multiplexing stage count of zero. An accumulative multiplexing differential represents a summation of differentials (e.g., a Higher Order (HO) to Lower Order (LO) ODU) at each traversed link of the path required by the multiplexing hierarchy to carry the LSP signal type end-to-end. For example, a path that traverses two links that use ODU2 into ODU3 multiplexing and ODU2 into ODU4 multiplexing, respectively, has the accumulative multiplexing differential of (ODU3−ODU2) or (3−2=1) summed with (ODU4−ODU2) or (4−2=2), resulting in an accumulative multiplexing differential of 3.

Figure 4A:
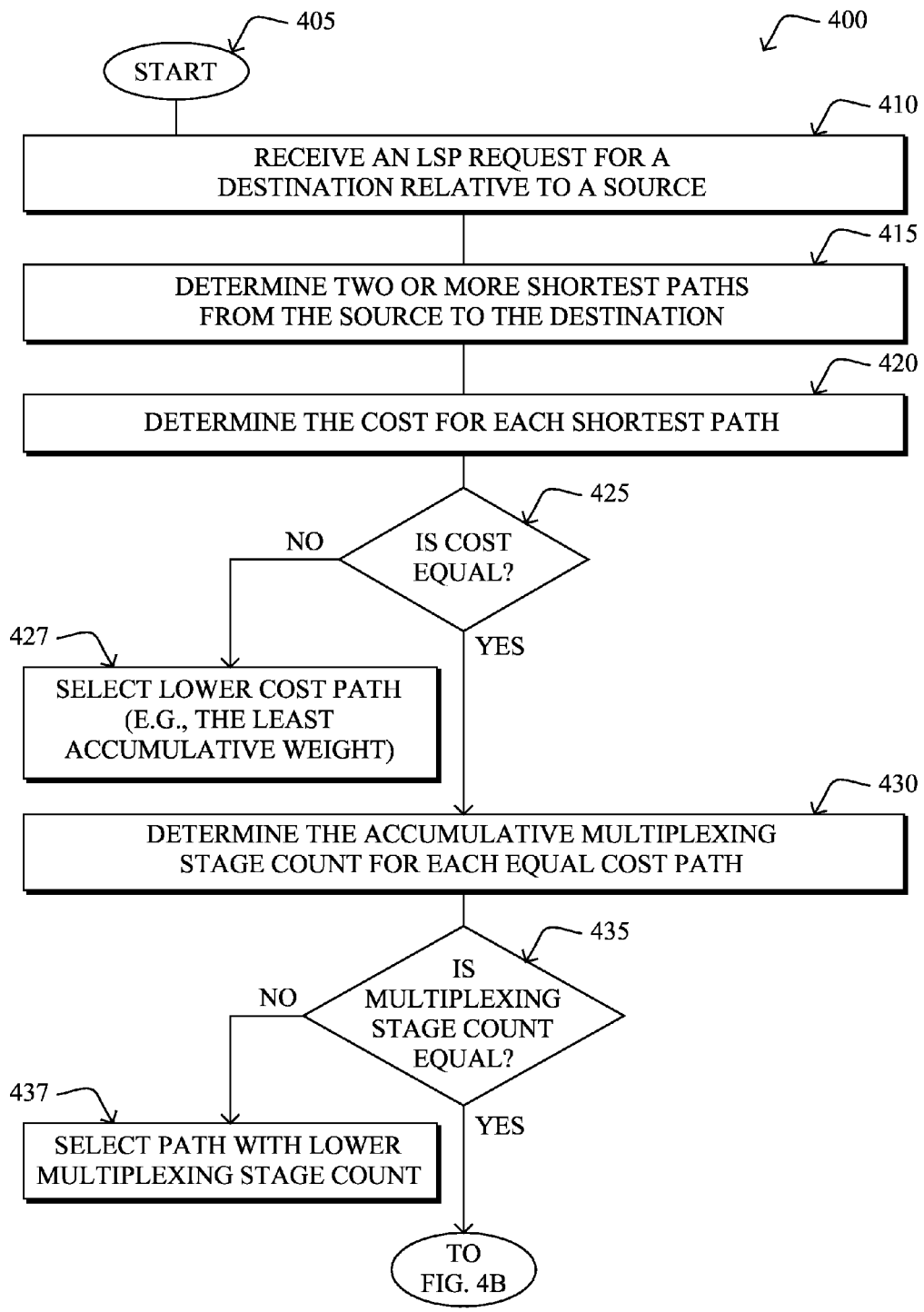
FIG. 4A illustrates one part of an example simplified procedure for path selection amongst various equal cost paths.
Figure 4B:
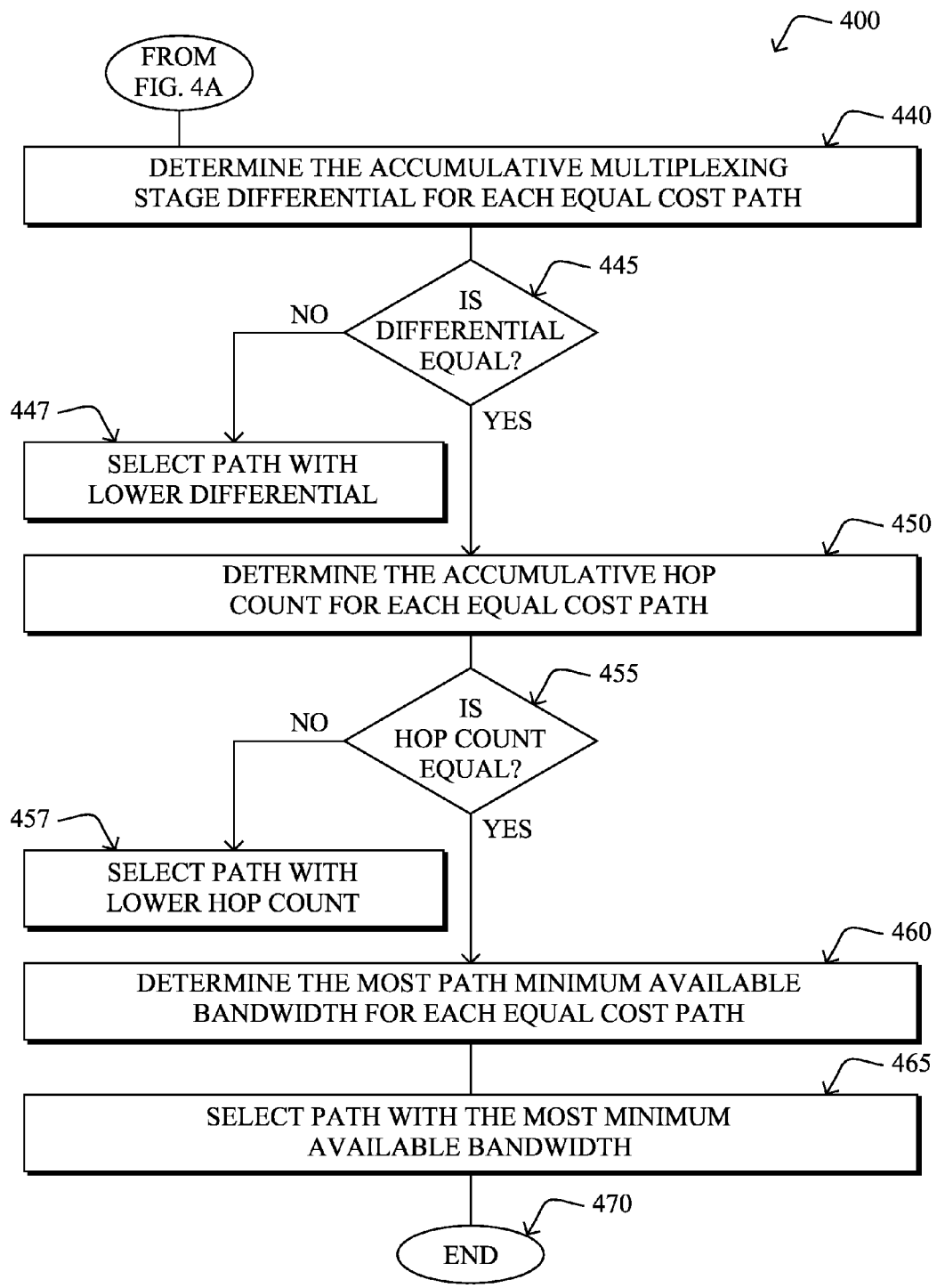
FIG. 4B illustrates a second part of the example simplified procedure for path selection amongst various equal cost paths, shown in FIG. 4A.

For example, FIG. 4 illustrates one example simplified selection technique (e.g., procedure 400) for path selection amongst various equal cost paths according the above discussed metrics. Procedure 400 begins at step 405 and continues to step 410, where a node receives a label switched path (LSP) request for a destination relative to a source. Procedure 400 continues to step 415 where the node determines two or more shortest paths from the source to the destination and in step 420, the node also determines the cost for each shortest path. If the cost is different for each of the two or more shortest paths, the node will select the lower cost path (step 427). However, if the shortest paths have an equal cost, procedure 400 continues to step 430 where the node determines an accumulative multiplexing stage count for each path. That is, the node determines, for each path-node of respective equal cost paths, a count of additional hierarchical bandwidth orders into which data for the LSP is transmitted. Put differently, as discussed above, the accumulative multiplexing stage count is a summation of stage hops of a different hierarchical (e.g., higher) order relative to the source node that are required to carry the data across the LSP end-to-end. For example, for a path that has two links that each use a single stage multiplexing (e.g., from ODU0 to ODU1), a resultant accumulative multiplexing stage count is two. Likewise, a path that uses links of the same multiplexing stage as the source node (e.g., the source is ODU0 with each of the two links of the path being ODU0) results in an accumulative multiplexing stage count of zero. Once the accumulative multiplexing stage count for each equal cost path is determined, procedure 400 proceeds to a decision step 435. From step 435, procedure 400 selects the path having a lower multiplexing stage count in step 437.

Notably, if the multiplexing stage count is equal for each of the equal cost paths, procedure 400 may illustratively continue to step 440, where the node determines an accumulative multiplexing differential for each equal cost path. As discussed above, the multiplexing differential is a stage differential of a higher order to a lower order ODU mapped for each link of a corresponding path. Put differently, the multiplexing differential is a differential between the bandwidth order of the LSP and a particular hierarchical bandwidth order into which data for the LSP is transmitted. For example, a path that traverses two links, with one link having a ODU1 into an ODU3 multiplexing and another link having an ODU1 into an ODU4 multiplexing, the resultant accumulative multiplexing differential equals ((3−1)+(4−1)) or five. Once the accumulative multiplexing differential for each path is determined, procedure 400 selects, in step 447, the path having the lower with the lower differential.

In the event that the multiplexing differential is also equal for each path, procedure 400 may then illustratively continue to step 450 where the node determines the accumulative hop count for each equal cost path (e.g., a number of path-nodes in each equal cost path). The node further determines if the hop count is equal in step 455 and, in step 457, selects the path having the lower hop count. If, however, the hop count is also equal, the node may further determine the path having the greatest amount of available bandwidth (also referred to as "minimum available bandwidth", i.e., an amount of unused bandwidth on a link/channel) for each equal cost path (step 460). As discussed in greater detail above, selection via a minimum available bandwidth can achieve load balancing, as understood by those skilled in the art. Subsequently, in step 465 selects the path having the most minimum available bandwidth. Procedure 400 illustratively ends in step 470.

It should be noted that certain steps within procedure 400 may be optional and the steps shown in FIG. 4 is merely examples for illustration. Certain other steps, as discussed herein, may be included or excluded as desired. Further, while a particular order of the steps is shown, this ordering is merely illustrative, and any suitable arrangement of the steps may be utilized without departing from the scope of the embodiments herein.

Illustratively, referring again to the schematic block diagram of an example node/device 200, the techniques described herein may be performed by hardware, software, and/or firmware, such as in accordance with the "path selection" process 244, which may contain computer executable instructions executed by the processor 220 (or independent processor of interfaces 210) to perform functions relating to the techniques described herein. For example, the techniques herein may be treated as extensions to conventional protocols (e.g., optical communication protocols, shortest path first (SPF) path selection algorithms, constrained shortest path first (CSPF) algorithms, MPLS LSP selection techniques, etc.), and as such, may be processed by similar components understood in the art that execute those protocols, accordingly.

As discussed above, when equal cost multiple paths exist, the path selection techniques optimizes network resources by minimizing one or more bandwidth-based transition values (e.g., an accumulative number of multiplexing stages, multiplexing differentials, etc.). Preferably, the techniques attempt to select paths that have zero stage multiplexing or links whose signal type matches that of the requested LSP signal type (whenever possible). Such selection results in zero or no fragmentation at the traversed links, and thus, provides efficient packing with no tributary slots left un-used (e.g., an ODUk packet is treated as an ODUk packet throughout each link to the destination). However, when zero stage multiplexing is not possible end-to-end, the selection technique (e.g., path selection process 244) minimizes the number of tunneled hierarchies (e.g., multiplexing stages) that a requested signal type has to be tunneled through at individual traversed links from end-to-end. By doing so, it reduces the possibility of allocating an HO (fat) ODU container to tunnel an LO (thin) ODU container on any link when the LO ODU can be directly mapped into an equivalent ODU container on another link. Notably, in such cases, the chances of the HO ODU container link accepting new requests that would otherwise not be possible may increase. For example, consider a path for an ODU2 request that traverses an OTU2 link L1 (i.e. producing a zero accumulative stage-hop count), and another equal cost feasible path over L2 that requires allocation of ODU2 into ODU3 on an OTU3 link (i.e. through 1 stage multiplexing). In such a case, the selection scheme favors the path through L1 which has zero accumulative stage-hop count.

Figure 5:
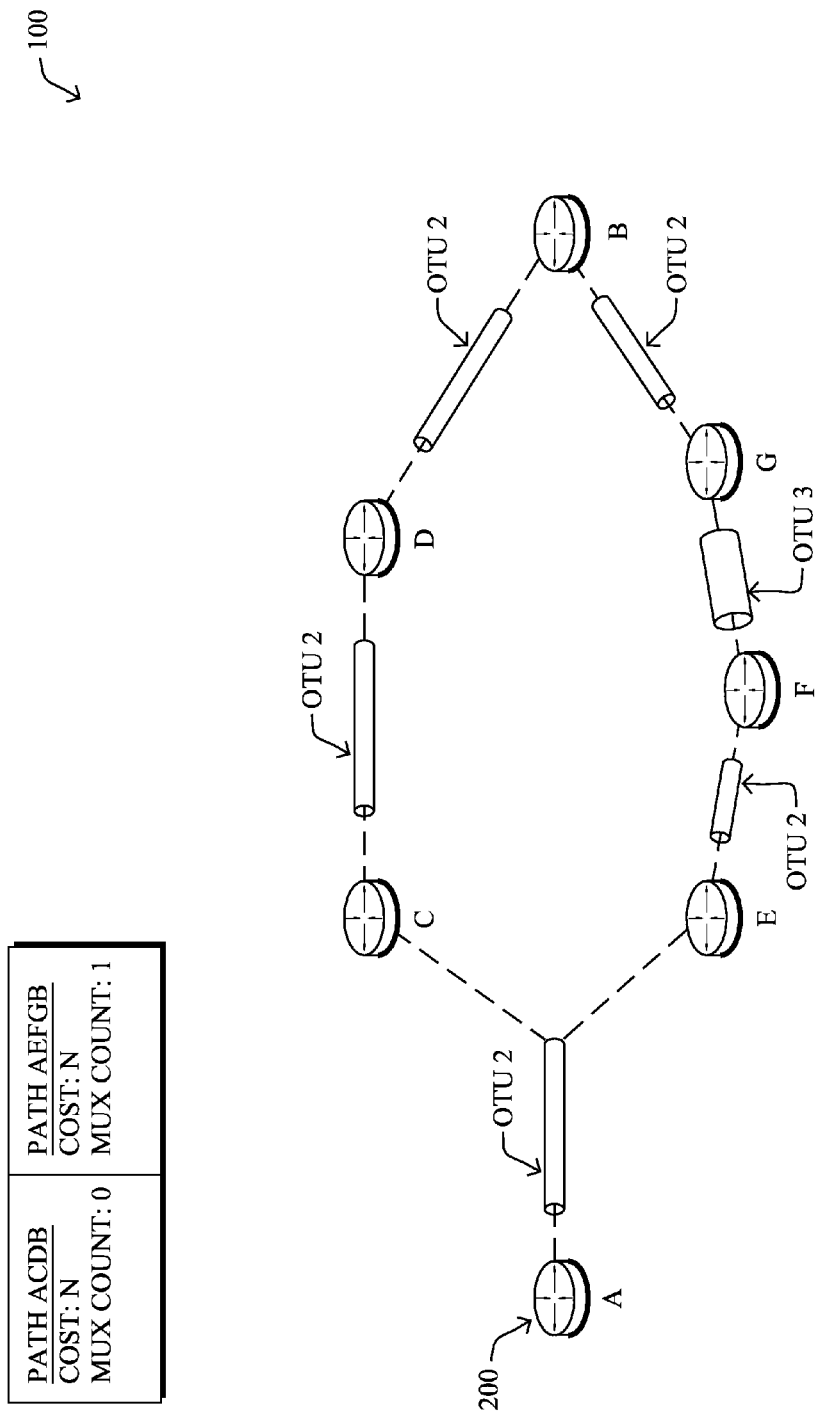
FIG. 5 illustrates path selection according to a bandwidth-based transition such as an accumulative multiplexing stage count.

For example, FIG. 5 illustrates path selection according to a bandwidth-based transition such as an accumulative multiplexing stage count. Operationally, node A receives a traffic demand request to route data for an LSP to node B. As discussed above, node A receives the LSP request and may determine, in response, at least two equal cost paths (e.g., Path ACDB and Path AEFGB), each having a cost "N". Node A further determines a total bandwidth-based transition value for each of path ACDB and Path AEFGB, and selects or favors the path having the lower total transition value (e.g., the lower accumulative multiplexing stage count). As illustrated, Path ACDB maintains an ODU2 multiplexing stage, which relative to the initial ODU2 message results in a multiplexing count of 0 since each link of the path performs no multiplexing relative to the initial ODU2 message. However, Path AEFGB yields a multiplexing stage count of 1, due to the link between node F and G (i.e., ODU3). That is, the initial ODU2 message is required to be multiplexed into an ODU3 to traverse Path AEFGB end-to-end. According to the selection techniques described herein, node A establishes the requested LSP over the path having the lower multiplexing stage count—here the path ACDB.

Figure 6:
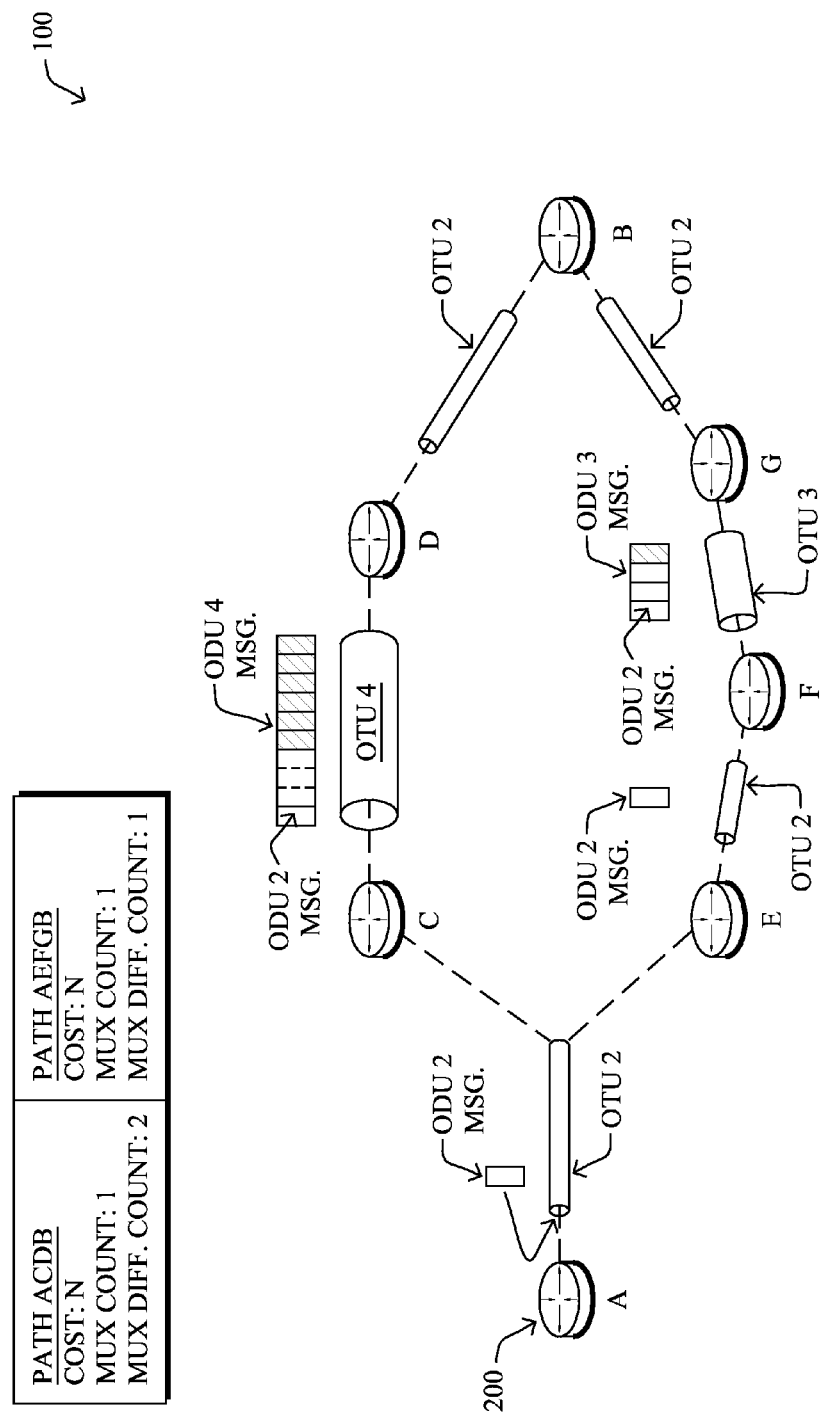
FIG. 6 illustrates another example embodiment of a path selection technique for two paths in a communication network.

FIG. 6 illustrates path selection amongst two paths in a communication network according to a bandwidth-based transition such as an accumulative multiplexing stage differential. As illustrated, Path ACDB has an OTU2 link to node C, an OTU4 link from node C to node D, and an OTU2 link from node D to node B while Path AEFGB has an ODU2 link to node F, an ODU3 link from node F to node G and an ODU2 link from node G to node B. As discussed above, the path selection techniques reduce fragmentation of ODU containers (ref. FIG. 3A) at traversed path links and optimizes efficient packing of ODU messages so as to reduce or eliminate un-used tributary slots for subsequent ODU encapsulation. Reducing fragmentation can be achieved by, for example, selecting a path having a lower multiplexing differential.

For example, as shown in FIG. 6, each equal cost path (i.e., Path ACDB and Path AEFGB) have different accumulative multiplexing differentials. In particular, Path ACDB has accumulative multiplexing differential of 2 and Path AEFGB has a multiplexing differential of 1. Path ACDB has an accumulative multiplexing differential of 2 since the differential of Higher Order to Lower Order ODU at each traversed link (e.g., the OTU4 link between node C and D) yields ODU4–ODU2, or an accumulative multiplexing differential of 2. Similarly, the differential of Higher Order to Lower Order ODU at each traversed link of path AEFGB at each traversed link (e.g., the OTU3 link between node F and G) yields ODU3–ODU2, or an accumulative multiplexing differential of 1. Selecting the path having the lower multiplexing differential more closely matches the requested traffic demand—here an ODU2—to the traversed link so as to minimize fragmentation of containers. Thus, according to the path selection techniques discussed above, path AEFGB is selected and the requested LSP is established over said path.

Operatively, such path selection achieves better packing and link utilization. For example, still referring to FIG. 6, assume 6×ODU2 are currently reserved by existing LSP requests for the OTU4 link between nodes C and D, leaving 4×ODU2 containers or 1×ODU3 container for the OTU4 link and assume 1×ODU2 is reserved by an existing LSP for the OTU3 link between node F and G leaving only 3×ODU2 containers available for the OTU3 link. According to these assumptions, allocating 1×ODU2 from the OTU4 link between node C and node D fragments the potential 1×ODU3 container and eliminates the possibility of allocating subsequent 1×ODU3 request. However, allocating the 1×ODU2 from the OTU3 link achieves better packing and link utilization since the OTU3 link is already fragmented into 4×ODU2 containers (with 3×ODU2 containers available). Such allocation of 1×ODU2 mapped to the OTU3 link merely uses one of the four available ODU2 containers or slots. Thus, selecting Path AEFG, with the OTU3 link between node F and G achieves better link utilization over Path AEFGB having the OTU4 link between node C and D.

Notably, still referring to FIG. 6, the multiplexing stage count and the multiplexing differential can be determined independently from each-other and any resultant path selection can be based on one or both or in any ordered combination.

Figure 7:
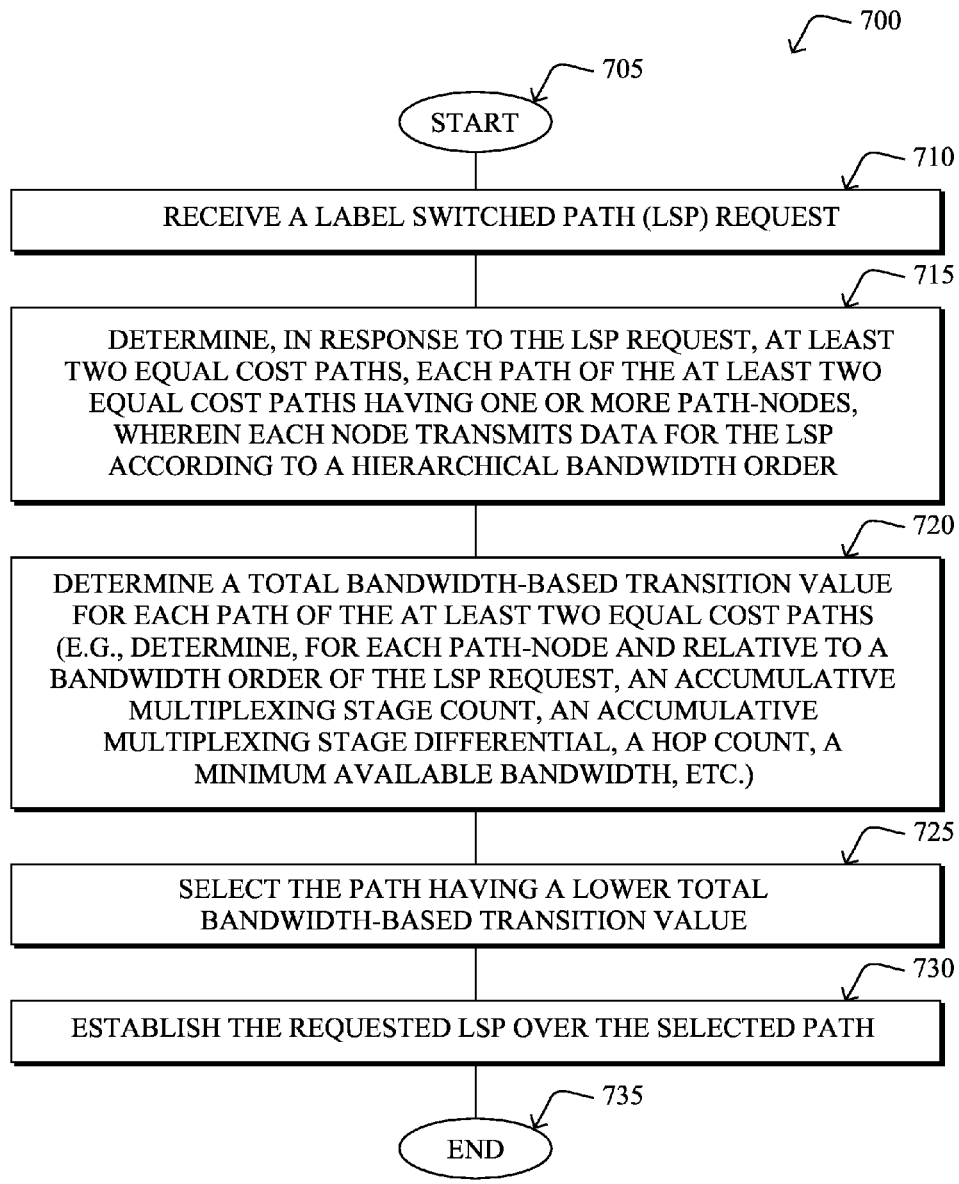
FIG. 7 illustrates an example simplified procedure for path selection procedure that maps traffic demands for multiple equal cost demands according to one or more path selection techniques described herein.

FIG. 7 illustrates an example simplified path selection procedure 700 to map traffic demands (e.g., LSP requests) for multiple equal cost paths in accordance with one or more embodiments described herein. The procedure 700 may start at step 705, and continues to step 710, where, as described in greater detail above, a node in a communication network receives a label switched path (LSP) request. In response to the LSP request, the node, in step 715, determines at least two equal cost paths with each path having one or more path-nodes. Notably, each node transmits data for the LSP according to a hierarchical bandwidth order (e.g., an ODU). Next, in step 720, the node determines a total bandwidth-based transition value for each of the equal cost paths. For example, as discussed above, the bandwidth-based transition value can include a multiplexing stage count (a count of additional hierarchical bandwidth orders into which data for the LSP is transmitted), a multiplexing differential (a differential between the bandwidth order of the LSP and a particular hierarchical bandwidth order into which data for the LSP is transmitted), a hop count (e.g., a total number of path nodes), a minimum available bandwidth, etc. Typically, the bandwidth-based transition value is determined for each path-node of the equal cost paths and relative to a bandwidth order of the LSP request. Once the total-bandwidth based transition value for the equal cost paths is determined, the node selects (in step 725) the path having a lower total bandwidth based transition value. For example, the lower total bandwidth based transition value can include the path having a lower accumulative multiplexing stage count, a lower accumulative multiplexing differential, a few number of path-nodes, or a most path minimum available bandwidth. Once selected, the node in step 730 establishes the requested LSP over the selected path. Procedure 700 may subsequently end in step 735, or may return to step 705 where the node receives a subsequent LSP request.

It should be noted that certain steps within procedures 700 may be optional and the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400 (FIG. 4) and 700 (FIG. 7) are described separately, certain steps from each procedure may be incorporated into each other procedure, and the procedures are not meant to be mutually exclusive.

The techniques described herein, therefore, provide for optimized path selection for traffic demand requests (e.g., LSP requests) in a communication network. In particular, the techniques herein track an accumulative path stage multiplexing and favor the path having lower or zero multiplex hierarchy paths. Additionally, the techniques also provide for path selection that minimizes the number of multiplexing hierarchy stages (e.g., multiplexing differentials). Favoring lower or zero multiplexing hierarchy paths and minimizing the number of multiplexing hierarchy stages required to route a request thus improves link utilization. With particular respect to minimizing the number of multiplexing hierarchy stages, HO ODU containers are preserved (e.g., not used for LO ODU requests) for subsequent requests. These techniques can further provide load balancing (e.g., selection via a minimum available bandwidth) for the traffic demand requests onto the multiple available paths in the network While there have been shown and described illustrative embodiments that provide for path selection amongst various equal cost paths to route a traffic request, it is to be understood that various other adaptations and modifications may be made within the spirit and scope of the embodiments herein. For example, the embodiments have been shown and described herein with relation to OTN networks. However, the embodiments in their broader sense are not as limited, and may, in fact, be used with other types of networks and/or protocols where appropriate.

For example, while the above embodiments have generally be described in terms of optical networks, the techniques may also be applied to hierarchical LSPs or other tunnels (e.g., according to multi-protocol label-switching traffic engineering, or "MPLS-TE"), as may be appreciated by those skilled in the art. For instance, as opposed to the hierarchy of ODUs, a collection of variously sized hierarchical LSPs may be used to carry traffic across a label-switched (tunneling) network. In this manner, the techniques herein may be used to select a path for a new LSP request that minimizes the total bandwidth-based transition value for each of the possible equal cost paths, in order to reduce or prevent bandwidth fragmentation of the hierarchical LSPs/tunnels in a similar manner to the ODUs as described above.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving, at a node in a communication network, a label switched path (LSP) request;

determining, in response to the LSP request, at least two equal cost paths, each path of the at least two equal cost paths having one or more path-nodes;

determining a total bandwidth-based transition value for each path of the at least two equal cost paths, wherein:

each path-node transmits data for the LSP according to a hierarchical bandwidth order, and determining the total bandwidth-based transition value for each path comprises:

determining, for each path-node and relative to a bandwidth order of the LSP request, a differential between the bandwidth order of the LSP and a particular hierarchical bandwidth order into which data for the LSP is transmitted, and totaling the differential for all of the path-nodes for each path to determine the total bandwidth-based transition value for each path;

selecting the path having a lower total transition value; and establishing the requested LSP over the selected path.

2. The method of claim 1, wherein:

determining the total bandwidth-based transition value for each path further comprises:

determining, for each path-node and relative to the bandwidth order of the LSP request, a count of additional hierarchical bandwidth orders into which data for the LSP is transmitted; and totaling the count for all of the path-nodes for each equal cost path to determine the total bandwidth-based transition value for each path.

3. The method of claim 1, wherein:

the total differential for all of the path-nodes for each path is equal; and determining the total bandwidth based transition value for each path further comprises totaling a number of path-nodes for each equal cost path, wherein a lower total corresponds to a lower total transition value.

4. The method of claim 1, wherein when the total differential for each path is equal, determining the total bandwidth based transition value for each path further comprises:

determining an available bandwidth for each equal cost path, and wherein selecting the path having a lower total transition value further comprises selecting the path having a higher minimum available bandwidth.

5. The method of claim 1, wherein:
determining the total bandwidth-based transition value for each path further comprises:
  determining, for each path-node and relative to the bandwidth order of the LSP request, a count of additional hierarchical bandwidth orders into which data for the LSP is transmitted;
  totaling the count for all of the path-nodes for each equal cost path to determine a first value for each path;
  wherein totaling the differential for all of the path-nodes for each path determines a second value for each path; and
  wherein, selecting the path having a lower total transition value comprises selecting the path based on the first value and the second value.

6. The method of claim 5, wherein, in response to the first value for each equal cost path being the same, selecting the path based on the first value and the second value comprises selecting the path based on the second value.

7. The method of claim 5, wherein, in response to the first value and the second value for each equal cost path being the same, the method further comprises:
  totaling a number of path-nodes for each equal cost path, wherein a lower total corresponds to a lower total transition value; and
  wherein, selecting the path based on the first value and the second value further comprises selecting the path based on the total number of path-nodes for each equal cost path.

8. The method of claim 1, wherein the LSP request is a traffic demand request.

9. The method of claim 1, wherein the bandwidth-based transition value is based on a bandwidth of optical data units (ODUs) in an optical transport network (OTN).

10. The method of claim 1, wherein the bandwidth-based transition value is further based on a bandwidth of hierarchical LSPs.

11. An apparatus, comprising:
  one or more network interfaces to communicate with an optical transport network (OTN);
  a processor coupled to the network interfaces and adapted to execute one or more processes; and
  a memory configured to store a process executable by the processor, the process when executed operable to:
    receive a label switched path (LSP) request;
    determine, in response to the LSP request, at least two equal cost paths, each path of the at least two equal cost paths having one or more path-nodes;
    determine a total bandwidth-based transition value for each path of the at least two equal cost paths, wherein:
      each path-node transmits data for the LSP according to a hierarchical bandwidth order, and
      the process to determine the total bandwidth-based transition value for each path, when executed is further operable to:
        determine, for each path-node and relative to a bandwidth order of the LSP request, a differential between the bandwidth order of the LSP and a particular hierarchical bandwidth order into which data for the LSP is transmitted, and
        total the differential for all of the path-nodes for each path to determine the total bandwidth-based transition value for each path;
    select the path having a lower total transition value; and
    establish the requested LSP over the selected path.

12. The apparatus of claim 11, wherein:
the process to determine the total bandwidth-based transition value for each path, when executed is further operable to:
  determine, for each path-node and relative to the bandwidth order of the LSP request, a count of additional hierarchical bandwidth orders into which data for the LSP is transmitted; and
  total the count for all of the path-nodes for each equal cost path to determine a first value associated with the total bandwidth-based transition value for each path, wherein the total the differential for all of the path-nodes for each path is a second value.

13. The apparatus of claim 11, wherein:
the total differential for all of the path-nodes for each path is equal; and
the process to determine the total bandwidth-based transition value for each path, when executed is further operable to total a number of path-nodes for each equal cost path, wherein a lower total corresponds to a lower total transition value.

14. The apparatus of claim 11, wherein:
the total count of differential hierarchical bandwidth orders that data is transmitted is equal and the total count of each high-to-low hierarchical bandwidth order change for each equal cost path is equal; and
the process to determine the total bandwidth-based transition value for each path, when executed is further operable to:
  determine an available bandwidth for each equal cost path; and
  wherein the process to select the path having the low transition value, when executed is further operable to select the path having a higher minimum available bandwidth.

15. The apparatus of claim 11, wherein, in response to the first value for each equal cost path being the same, the process to select the path based on the first value and a second value when executed, is further operable to select the path based on the second value.

16. The apparatus of claim 11, wherein, in response to the first value and a second value for each equal cost path being the same, the process when executed is further operable to:
  total a number of path-nodes for each equal cost path, wherein a lower total corresponds to a lower total transition value, and
  wherein, the process to select the path based on the first value and the second value when executed, is further operable to select the path based on the total number of path-nodes for each equal cost path.

17. The apparatus as in claim 11, wherein the bandwidth-based transition value is based on a bandwidth of optical data units (ODUs) in an optical transport network (OTN).

18. A tangible, non-transitory, computer-readable media having software encoded thereon, the software when executed by a processor operable to:
  receive a label switched path (LSP) request;
  determine, in response to the LSP request, at least two equal cost paths, each path of the at least two equal cost paths having one or more path-nodes;

determine a total bandwidth-based transition value for each path of the at least two equal cost paths, wherein:
  each path-node transmits data for the LSP according to a hierarchical bandwidth order, and
  the determination of the total bandwidth-based transition value for each path comprises:
    determining, for each path-node and relative to a bandwidth order of the LSP request, a differential between the bandwidth order of the LSP and a particular hierarchical bandwidth order into which data for the LSP is transmitted, and
    totaling the differential for all of the path-nodes for each path to determine the total bandwidth-based transition value for each path;
select the path having a lower total transition value; and
establish the requested LSP over the selected path.

* * * * *